(12) United States Patent
Dalla Valle

(10) Patent No.: US 7,541,387 B2
(45) Date of Patent: Jun. 2, 2009

(54) AGGLOMERATED MATERIAL CONTAINING RECYCLED SILICON

(75) Inventor: Roberto Dalla Valle, Bussolengo (IT)

(73) Assignee: Stone Italiana SpA (IT)

( * ) Notice: Subject to any disclaimer, the term of this patent is extended or adjusted under 35 U.S.C. 154(b) by 437 days.

(21) Appl. No.: 10/521,482

(22) PCT Filed: Jun. 3, 2003

(86) PCT No.: PCT/IT03/00346

§ 371 (c)(1), (2), (4) Date: Sep. 7, 2005

(87) PCT Pub. No.: WO2004/009509

PCT Pub. Date: Jan. 29, 2004

(65) Prior Publication Data

US 2006/0051598 A1 Mar. 9, 2006

(30) Foreign Application Priority Data

Jul. 22, 2002 (IT) .......................... VR20020048 U

(51) Int. Cl.
*C08J 11/04* (2006.01)

(52) U.S. Cl. .......................... 521/40; 524/401; 524/439

(58) Field of Classification Search ................. 524/442, 524/492, 401, 439; 521/40
See application file for complete search history.

(56) References Cited

U.S. PATENT DOCUMENTS 4,116,705 A 9/1978 Chappell

FOREIGN PATENT DOCUMENTS

| DE | 43 23 217 C1 | 8/1994 |
|---|---|---|
| EP | 0 669 292 A1 | 8/1995 |
| FR | 323.356 | 8/1902 |
| FR | 720.972 | 8/1931 |

OTHER PUBLICATIONS

International Search Report—dated Nov. 13, 2003—European Patent Office.
XP-002260045 (Database WPI Week 199338 Derwent Publications Ltd., London, GB AN 1993-301447 (SU1763424), (1993).
Chemical Abstracts, vol. 115, No. 10, Sep. 9, 1991, Columbus, Ohio, US, Abstract No. 98045j, p. 360—XP000251440 (JP 03 075251 A).

*Primary Examiner*—Edward J Cain
(74) *Attorney, Agent, or Firm*—Greenberg Traurig, LLP

(57) ABSTRACT

An agglomerate material, advantageously used for the production of sheets or slabs or blocks for flouring and/or cladding or furnishing items consists of a mixture comprising between 1% and 75% of a raw material being IT industry recycled silicon tablets in the form of powders, grit or the like, between 5% and 20% of a binder, a colorant and a filler aggregate.

9 Claims, No Drawings

AGGLOMERATED MATERIAL CONTAINING RECYCLED SILICON

TECHNICAL FIELD

The present invention refers to a sheet or slab or block made of an agglomerate material consisting of a recycled pure silicon-based mixture, a binder advantageously consisting of a resin and a filler advantageously consisting of quartz sand and/or crushed stone material.

More specifically, the present invention concerns sheets of agglomerate material which can be used for the construction of flooring or wall cladding, both internal and external.

The pure silicon raw material is mixed with the binders and fillers in the form of powder, grit or the like.

The present invention is of particular use in the building sector and in the manufacturing industry for the machining of marble, stone, granite and the like.

A further use of the agglomerate material according to the invention concerns the furnishing sector in general; more specifically, this material can be advantageously used in the production of shelves for kitchens or bathrooms, tables, counter-tops, stairs, etc.

BACKGROUND ART

Marble- and/or granite- and/or natural stone- and/or quartz sand-based agglomerate materials are known in the background art, the mixing of which makes it possible to obtain an artificial product which can be used as cladding and/or flooring material in general or to obtain made-to-measure pieces such as steps, bathroom and kitchen worktops, window sills, etc.

Attempts are often made to give especially the visible surface of the object a particularly attractive appearance with considerable visual impact, sometimes resorting to the inclusion of metal powders or grits or of pieces of precious stones of various kinds, glass, mirrors, etc.

These attempts, consisting of the addition of colorants or of inserts of shiny material, have made it possible to obtain a product with a good degree of shine and an acceptable degree of surface mechanical resistance.

Natural stone does not present isotropic reflecting properties, which can on the other hand be achieved with an artificial agglomerate material which is stone-based together with other inserts.

These agglomerate materials are normally produced according to a production procedure which includes the following working stages:

- a first stage in which the various materials making up the agglomerate are crushed;
- a second stage in which the crushed materials are mixed, in order to obtain as homogeneous a product as possible, during which binders, for example resins, are added;
- a third stage in which the crushed materials are levelled and rolled;
- a fourth stage in which the crushed and rolled material is loaded into a distribution hopper;
- a fifth stage in which the hopper is unloaded in order to load the crushed and rolled material into a distributor;
- a sixth stage of relative reciprocating translation of the distributor above special dies with simultaneous mixing of the material contained in the distributor;
- a seventh stage in which the material is discharged from the distributor into the dies designed to give the agglomerate material a well-defined configuration, for example of a tile or panel;
- an eighth stage in which the agglomerate is pressed and compacted;
- a ninth stage in which the tile or panel is hardened at a predetermined temperature;
- a tenth stage in which at least one side of the tile or panel is smoothed and polished;
- an eleventh stage in which the tile or panel is cut to size, chamfered, gauged and flared, followed by unloading of the end product.

It should be remembered that the percentage of resin used in the above-mentioned mixtures is particularly important and should be established with great care and precision.

If the quantity of resin is too high, in fact, the sheet obtained will be too soft, with a closed-cell honeycomb structure which, during the subsequent vibration and vacuum pressing, does not allow the air trapped in the mixture to be released.

If, on the other hand, the quantity of resin is insufficient, the mixture will be particularly dry, with little cohesion and insufficient amalgamation during vibration pressing.

It is known, moreover, that the hardness and the resistance to rubbing wear of sheets of agglomerate material can be increased by adding very fine silicon sand or powder to the mixture, which does not become impregnated with resin and acts as a filler material, allowing, at the same time, a reduction in the quantity of resin to be used.

One disadvantage is represented by the fact that while this agglomerate material presents sufficient mechanical features that allow it to be used for external cladding, it does not maintain its features unaltered over time.

One of the main problems that modern society has been forced to deal with as a result of the mass diffusion of IT products is the disposal and recycling of products and materials normally used in computers.

These materials include, for example, the wafers of very pure silicon used as a support for microchips, and for which an appropriate way of disposal and recycling has not yet been found. It would in any case be desirable to identify a method for the disposal and recycling of this material which is in itself expensive, but cannot be used again.

Document FR-A-720972 discloses a material containing silicon, suitable for covering a number of different articles and for building up a protecting layer on these articles. Chemical Abstracts, vol. 115, No. 10, 9 September 1991 & JP-A-03075251 describes a mortar composition comprising a small amount of metallic silicon powder. Document SU-A-1763424 discloses the use of silicon deriving from metallurgical and chemical industry. Here silicon is mixed in water together with many other components such as refractor clay and graphite.

DESCRIPTION OF THE INVENTION

The present invention aims to eliminate or significantly reduce the known problems of the background art and to provide, therefore, a sheet or slab or block made of an agglomerate material presenting high mechanical resistance and an attractive appearance.

This is achieved by means of a sheet or slab or block made of an agglomerate material with the features described in the main claim, the raw material of which consists of recycled pure silicon.

The dependent claims describe particularly advantageous embodiments of the invention.

The agglomerate material according to this invention consists of a mixture comprising fragments of recycled pure silicon at a percentage normally between 1% and 75% varying in weight with respect to the total weight of the material, a binder between 5% and 15% in weight with respect to the total weight of the material, any colorants and aggregate consisting of crushed stone material and/or quartz sand to make up the weight of the mixture.

According to the invention, the pure silicon fragments are in the form of tablets, normally defined as "wafers" previously used as hardware components of processors and printed circuits for IT and industrial use.

The agglomerate material according to this invention presents excellent physical and mechanical features that do not alter over time, together with a good degree of shine.

The resulting sheets can be advantageously used for internal flooring in buildings, to construct a worktop for a table or a kitchen or can be used for flooring and cladding of any kind.

This agglomerate material, with inserts in recycled silicon, also presents a high ultimate tensile strength together with resistance to abrasion and to particularly acid environments.

The artificial agglomerate material according to this invention also has a high degree of resistance to atmospheric agents, chemical agents and rubbing wear, allowing the construction of particularly long-lasting artificial tiles or paving slabs that maintain their appearance for a long time.

Two non-binding examples are described below of the formulation of the agglomerate material according to the invention for obtaining sheets by means of procedures known to the background art.

DESCRIPTION OF SOME FORMS OF EMBODIMENT

The examples described below indicate the components of the recycled silicon-based agglomerate material according to the invention and their percentages in weight with respect to the total weight of a sample of the material, except for the colorant for which no specific percentage is indicated.

EXAMPLE 1

| | |
|---|---|
| SSTD stone material with granulometry from 0.3 to 0.8 millimeters | 9.70%, |
| SSFR stone material with granulometry from 0.1 to 0.3 millimeters | 14.82%, |
| fragments of silicon tablets | 41.83%, |
| quartz 64/100 | 25.76%, |
| Lonza resin | 7.89%. |

ESEMPIO 2

| | |
|---|---|
| SSTD stone material with granulometry from 0.3 to 0.8 millimeters | 7.50%, |
| SSFR stone material with granulometry from 0.1 to 0.3 millimeters | 11.44%, |
| fragments of silicon tablets | 50.63%, |
| quartz 64/100 | 22.12%, |
| Lonza resin | 8.31%. |

The silicon tablets are recycled from previous use as wafers supporting microchips and printed circuits used as electronic component hardware.

The fragmentation of these tablets can present a fine granulometry of the order of a few tenths of a millimetre up to granulometric values of a few millimetres.

If the agglomerate material is produced in blocks and subsequently cut into sheets, or other appropriate shapes according to specific requirements, the cut surfaces also present excellent reflecting properties since the silicon fragments have an extremely fine granulometry so as to isotropically preserve their shine features.

The invention is described above with reference to some particular forms of embodiment.

It is nevertheless clear that the invention is not limited to these forms of embodiment but includes all the modifications and variations that can be considered, without going beyond the scope of this invention as claimed.

For example, in addition to foreseeing the possible use of polymerisation catalysts and accelerators, the invention can foresee the insertion of various types of materials in the mixture, such as fragments of metal or wood, or glass microspheres, etc.

The invention claimed is:

1. An agglomerate material mixture comprising:
   at least one raw material between 1% and 75% in weight with respect to the total weight of the material, wherein the raw material is constituted by fragments of pure silicon tablets previously used in the electronic industry as wafer supporting microchips and printed circuits silicon tablets;
   a binder between 5% and 20% in weight with respect to the total weight of the material; and
   a colorant and a filler aggregate to make up the weight of the mixture;
   the raw material being mixed with the above components.

2. The agglomerate material mixture of claim 1, wherein the granulometry of the silicon tablet fragments ranges from a few tenths of a millimeter to a few millimeters.

3. The agglomerate material mixture of claim 1, wherein the silicon tablet fragments are in one of a powder form and a grit form.

4. The agglomerate material mixture of claim 1, wherein the raw material is mixed with the above components in one of a powder form and a grit form.

5. The agglomerate material mixture of claim 1, wherein the colorant is one of a crushed stone material and a quartz sand.

6. The agglomerate material mixture of claim 1, wherein the filler aggregate is one of a crushed stone material and a quartz sand.

7. The agglomerate material mixture of claim 1, wherein the agglomerate material mixture is in the form of a sheet.

8. The agglomerate material mixture of claim 1, wherein the agglomerate material mixture is in the form of a slab.

9. The agglomerate material mixture of claim 1, wherein the agglomerate material mixture is in the form of a block.

* * * * *